US008269725B2

(12) United States Patent
Hall et al.

(10) Patent No.: US 8,269,725 B2
(45) Date of Patent: Sep. 18, 2012

(54) INPUT SIMULATION SYSTEM FOR TOUCH BASED DEVICES

(75) Inventors: Cornelius J. Hall, Redmond, WA (US); Olumuyiwa Durojaiye, Bothell, WA (US); Sumit Mehrotra, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1273 days.

(21) Appl. No.: 11/426,998

(22) Filed: Jun. 28, 2006

(65) Prior Publication Data

US 2008/0001923 A1    Jan. 3, 2008

(51) Int. Cl.
*G06F 3/041* (2006.01)
(52) U.S. Cl. .................. 345/173; 345/179; 178/18.01; 382/186
(58) Field of Classification Search .......... 345/173–179; 178/18.01–18.11, 19.01–19.07
See application file for complete search history.

(56) References Cited

U.S. PATENT DOCUMENTS

| | | | |
|---|---|---|---|
| 5,714,808 A | 2/1998 | Ansel et al. | |
| 5,767,457 A | 6/1998 | Gerpheide et al. | |
| 5,882,206 A | 3/1999 | Gillio | |
| 6,283,763 B1 | 9/2001 | Matsuzaki et al. | |
| 6,333,753 B1 | 12/2001 | Hinckley | |
| 6,807,520 B1 | 10/2004 | Zhou et al. | |
| 6,888,536 B2 | 5/2005 | Westerman et al. | |
| 7,345,681 B2 * | 3/2008 | Mehrotra et al. | 345/179 |
| 2001/0043291 A1 | 11/2001 | Kono et al. | |
| 2003/0063073 A1 * | 4/2003 | Geaghan et al. | 345/173 |
| 2004/0130525 A1 | 7/2004 | Suchocki | |
| 2007/0152976 A1 * | 7/2007 | Townsend et al. | 345/173 |

OTHER PUBLICATIONS

Ottensmeyer, MP, Ben-Ur, E., and Salisbury, J.K., "Input and output for surgical simulation: devices to measure tissue properties in vivo and a haptic interface for laparoscopy simulators," Stud Health Technol Inform. 2000: 70:236-42 http://www.ncbi.nlm.gov/entrez/query.fegi?emd=Retrieve&db=PubMed&list_uids=10977548&dopt=Abstract, printed Apr. 13, 2006.
Ryall, K., Forlines, C., Shen, C., Morris, M.R., and Everitt, K., "Experiences with and Observations of Direct-Touch Tabletops," Horizontal Interactive Human-Computer Systems, 2006. Tabletop International Workshop on Jan. 5-7, 2006, pp. 89-96 http://ieeexplore.ieee.org/search/srchabstract.jsp?arnumber=1579197&isnumber=33359&p . . . printed Apr. 13, 2006.
Novint http://www.novint.com/etouch2.htm printed Apr. 13, 2006.
Hespanha, J., McLaughlin, M.L., and Sukhatme, G., "Introduction to Haptics: How Devices Can Emulate Touch," Sep. 6, 2002 http://www.phptr.com/articles/article.asp?p=29226&seqNum=1, printed Apr. 13, 2006.

* cited by examiner

*Primary Examiner* — Kevin M Nguyen
*Assistant Examiner* — Kenneth B Lee, Jr.
(74) *Attorney, Agent, or Firm* — Lee & Hayes, PLLC

(57) ABSTRACT

Performance of automated touch data injection into a stack of software objects is provided. Previously stored data from a touch data file is received and transformed based upon a touch property. The transformed retrieved data is then injected into a lowermost layer of a stack of software objects. A computer-readable medium tool allows a user, such as a software developer, to create data that can consistently be employed to simulate the operation of movement of a user's finger across a touch input area. A buffer management module retrieves data from a touch data file. A data transformation module transforms the retrieved data based upon a touch property. A device management module injects transformed retrieved data into a human interface layer of a device.

20 Claims, 11 Drawing Sheets

INPUT SIMULATION SYSTEM FOR TOUCH BASED DEVICES

BACKGROUND

Computing devices which allow a user to enter data with a stylus are becoming more and more popular. This type of computing device, which includes personal digital assistants and tablet personal computers, often allow a user to enter data by writing on a surface with a stylus to create electronic ink. The user moves the pen or stylus over a digitizing surface, and an underlying ink-enabled software platform converts the physical movement of the pen into ink strokes and eventually into groupings of handwritten words or drawings. Electronic ink is particularly convenient for users who cannot type quickly with a keyboard, or when the use of a keyboard is impractical.

As the use of computers in both the workplace and home has increased, so has the need to develop user friendly computers. One type of computer that creates a user friendly environment for interaction purposes is one with a digitizer, such as a tablet type computer. A tablet style computer allows a user to interact with a computer as if writing on a piece of paper or other flat surface. The tablet style computer has introduced this concept of a pen as an input device and ink as a native data type in an operating system platform. Beyond pen based systems, touch based input, e.g., using a user's finger across a digitizer, on the same platform is a logical next step.

As a user touches across the display surface of a digitizer with her finger, digital ink is captured for where the user has positioned her finger. Application programs, such as OneNote by Microsoft® Corporation of Redmond, Wash., run on an operating system. An application program takes the input strokes received from the user touching on the display surface and processes the data to perform some function. For example, the input strokes may be used by an application program to produce letters and words handwritten by the user.

While touch enabled platforms and corresponding touch aware software applications and controls are becoming more common, it is difficult to efficiently test these platforms and such touch aware applications and controls. Efficient testing is challenging because touching is an inherently manual process, and the features of a touch input are highly dependent on the individual touching the touch input. After all, a person has to move her finger around in order to drive any touch aware applications.

For example, a software developer may want to test how well a soft keyboard of a tablet input panel or "TIP" (i.e., a stand-alone user interface for receiving pointer inputs, may be through touch, converting the input into text and then inserting the text into a target application) operates with an application. In order to test the TIP, the developer would need to (1) launch the application, such as Notepad by Microsoft® Corporation of Redmond, Wash., (2) launch the tablet input panel, (3) switch to a control, soft keyboard, that will accept input, (4) touch in the desired text input, such as "Hello World," and (5), verify that the proper text was accurately inserted into the application.

Each of steps (1)-(3) and (5) are straightforward, and testing automation processes are well known to execute each of these steps. Step (4), however, can be time consuming if manually performed, especially if the software developer wishes to execute multiple (e.g., more than 1,000) tests in a test pass with multiple runs of the test pass. Further, if the tester wished to run different variations of the same test, then the user would need to repeat step (4) even more often.

In order to make the testing of touch enabled platforms and touch aware applications and controls more efficient and reproducible, it would be desirable to automate the process of creating touch input data. In this manner, the same touch input data can be created for testing once and used again and again. One such technique for consistently recreating touch input data is to have a test engineer manually enter touch data into the touch enabled platform. While this approach will consistently recreate touch input data, it is relatively slow, difficult to employ on a large scale, and resource intensive.

BRIEF SUMMARY

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the present invention are directed to a method and media for injecting touch data into a lowermost layer of a stack of software objects. Various examples allow a user, such as a software developer, to create test data that can consistently be employed to simulate the operation of touch input. Moreover, these examples allow the data to be used to test a variety of different types of software platforms, applications and controls (hereafter collectively referred to as software objects). With various implementations, raw touch input data, such as position coordinates, pressure, and finger size, are captured. This raw touch input data is then later injected into a system being tested in place of touch input data from a device driver.

The raw touch input data may be captured through an application programming interface invoked by a host application, such as a test software application for testing other software applications. The captured data can then subsequently be injected through another application programming interface invoked by the test application. Still other implementations may employ a special purpose tool for capturing and then injecting raw touch input data.

BRIEF DESCRIPTION OF THE DRAWINGS

A more complete understanding of aspects of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which features may be practiced. It is to be understood that other embodiments may be utilized and structural and functional modifications may be made.

Figure 1:
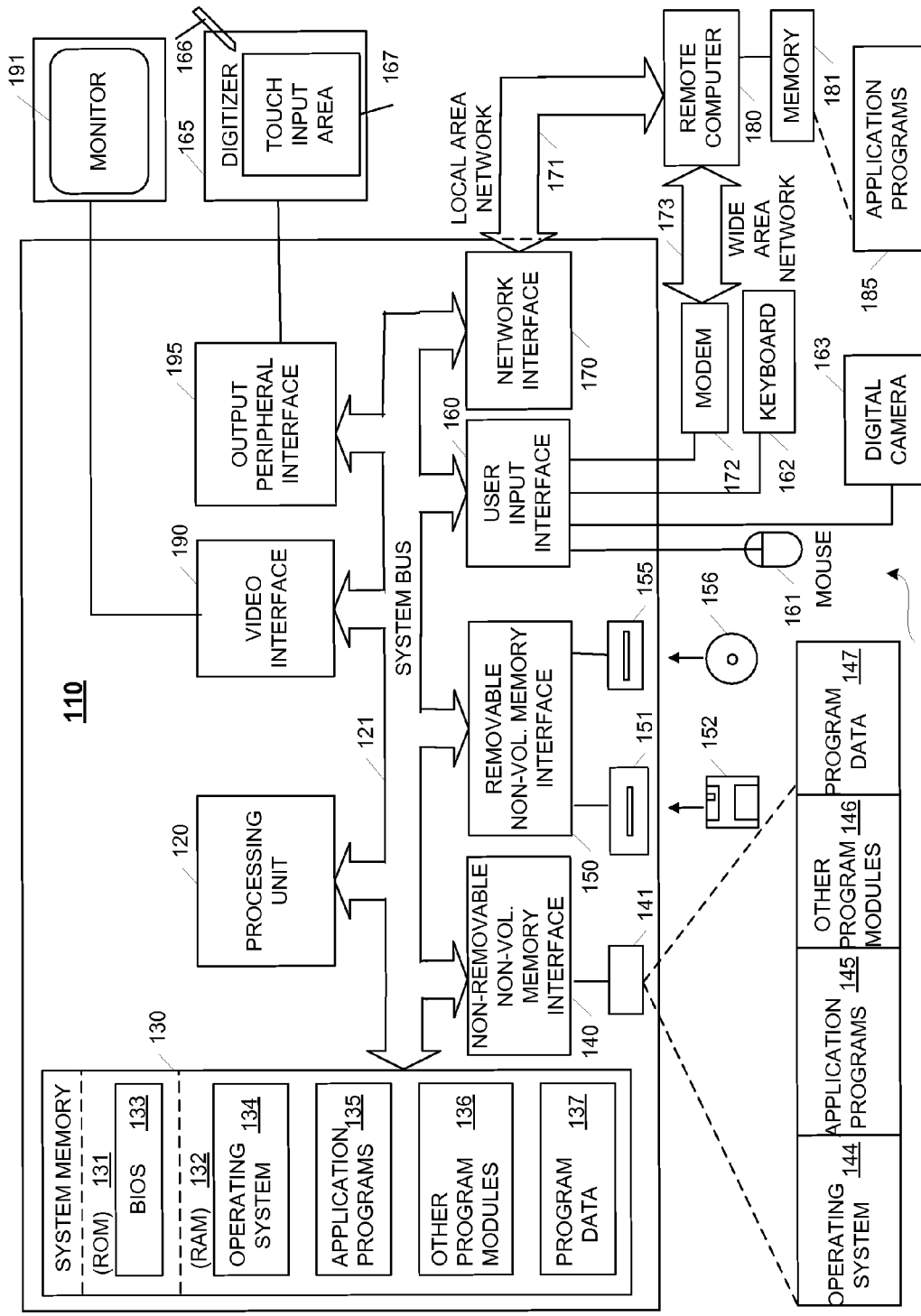
FIGS. 1 and 2 illustrate a computing environment in which various examples of the invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera 163, a keyboard 162, and pointing device 161, commonly referred to as a mouse, trackball or touch pad. Other input devices may include a pen (not shown), stylus (166) and tablet (165), microphone (not shown), joystick (not shown), game pad (not shown), satellite dish (not shown), scanner (not shown), or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

In one example, a digitizer 165 with a touch input area 167 and accompanying pen or stylus 166 are provided in order to digitally capture freehand input, whether with use of a stylus 166 or by having a user directly touch the input area 167 surface of the digitizer 165. Although a connection between the digitizer 165 and the serial port interface 106 is shown in FIG. 1, in practice, the digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Although the FIG. 1 environment shows an exemplary environment, it will be understood that other computing environments also may be used. For example, one or more examples of the present invention may use an environment having fewer than all of the various aspects shown in FIG. 1 and described above, and these aspects may appear in various combinations and subcombinations that will be apparent to one of ordinary skill.

Figure 2:
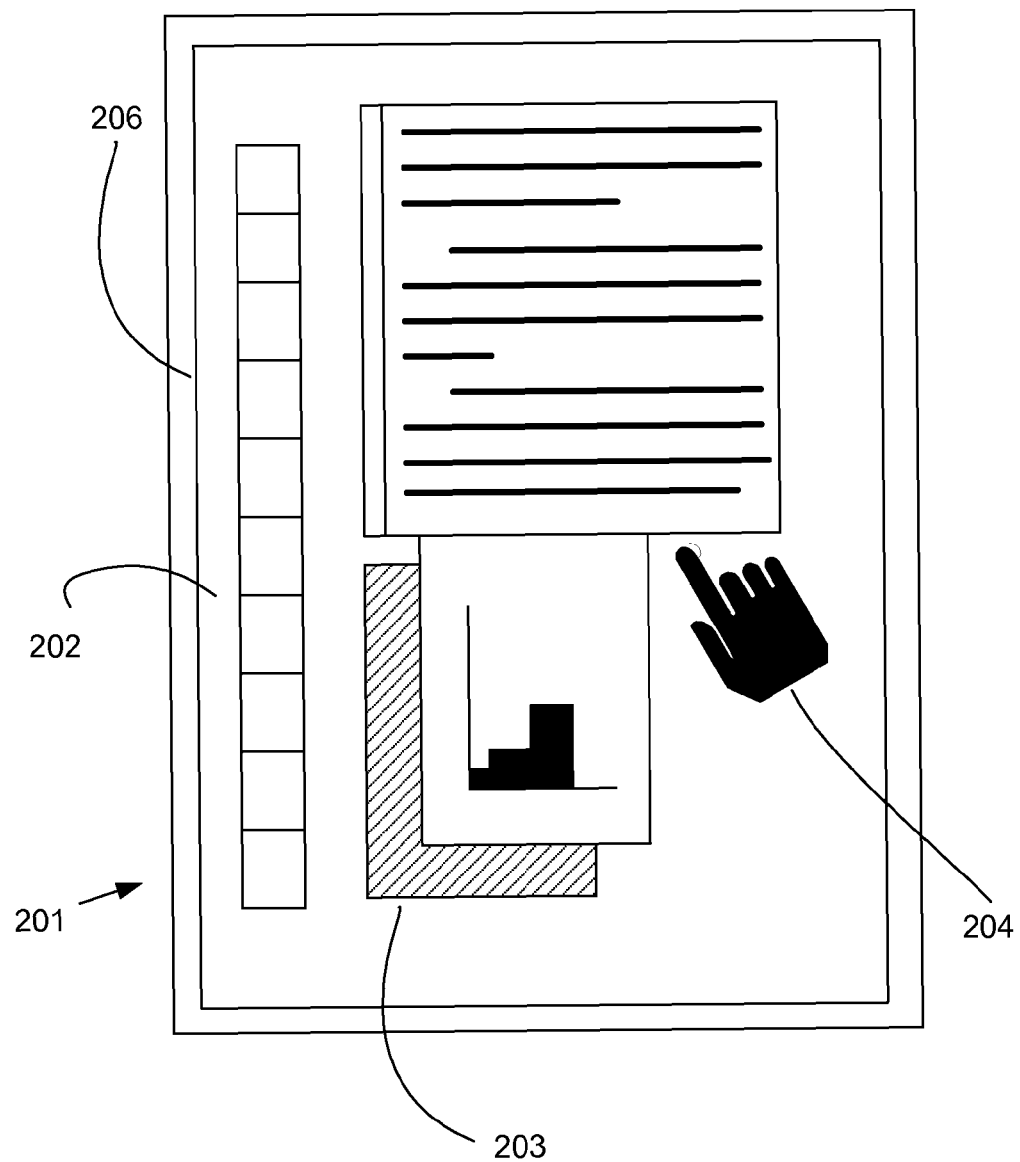

FIG. 2 illustrates a tablet type personal computer (PC) 201 that can be used in accordance with various aspects of the present invention. Any or all of the features, subsystems, and functions in the system of FIG. 1 can be included in the computer of FIG. 2. The tablet type personal computer system 201 includes a large display surface 202, e.g., a digitizing flat panel display, such as a liquid crystal display (LCD) screen, on which a plurality of windows 203 is displayed. Using her finger 204, a user can select, highlight, and write with the touch input area 206 of the digitizing display area 202. The tablet type computing system 201 interprets gestures made using the user's finger 204 across the touch input area 206 in order to manipulate data, enter text, and execute conventional computer application tasks, such as creating, editing, and modifying spreadsheets, word processing programs, and the like. In this example, the touch input area 206 may correspond to substantially the entire display surface 202.

In various examples, the system provides a touch aware platform as a set of COM (component object model) services that an application program can use to capture, manipulate, and store touch data. The touch aware platform also may include a mark-up language including a language like the extensible markup language (XML). Further, the system may use DCOM as another implementation. Yet further implementations may be used including the Win32 programming model and the .Net programming model from Microsoft® Corporation of Redmond, Wash. These platforms are commercially available and known in the art.

In addition to use with full performance tablet type computing systems or "tablet PCs" (e.g., convertible laptops or "slate" type tablet PCs), aspects of the present invention may be used in conjunction with other types of touch aware computing systems and/or other devices that accept data as touch input, such as: hand-held or palm-top computing systems; personal digital assistants; pocket personal computers; mobile and cellular telephones, pagers, and other communication devices; watches; appliances; and any other devices or systems that include a monitor or other display device and/or a digitizer that presents printed or graphical information to users and/or allows touch input, or which can process touch input data collected by another device (e.g., a conventional desktop computer that can process touch input data collected by a tablet PC).

Figure 3:
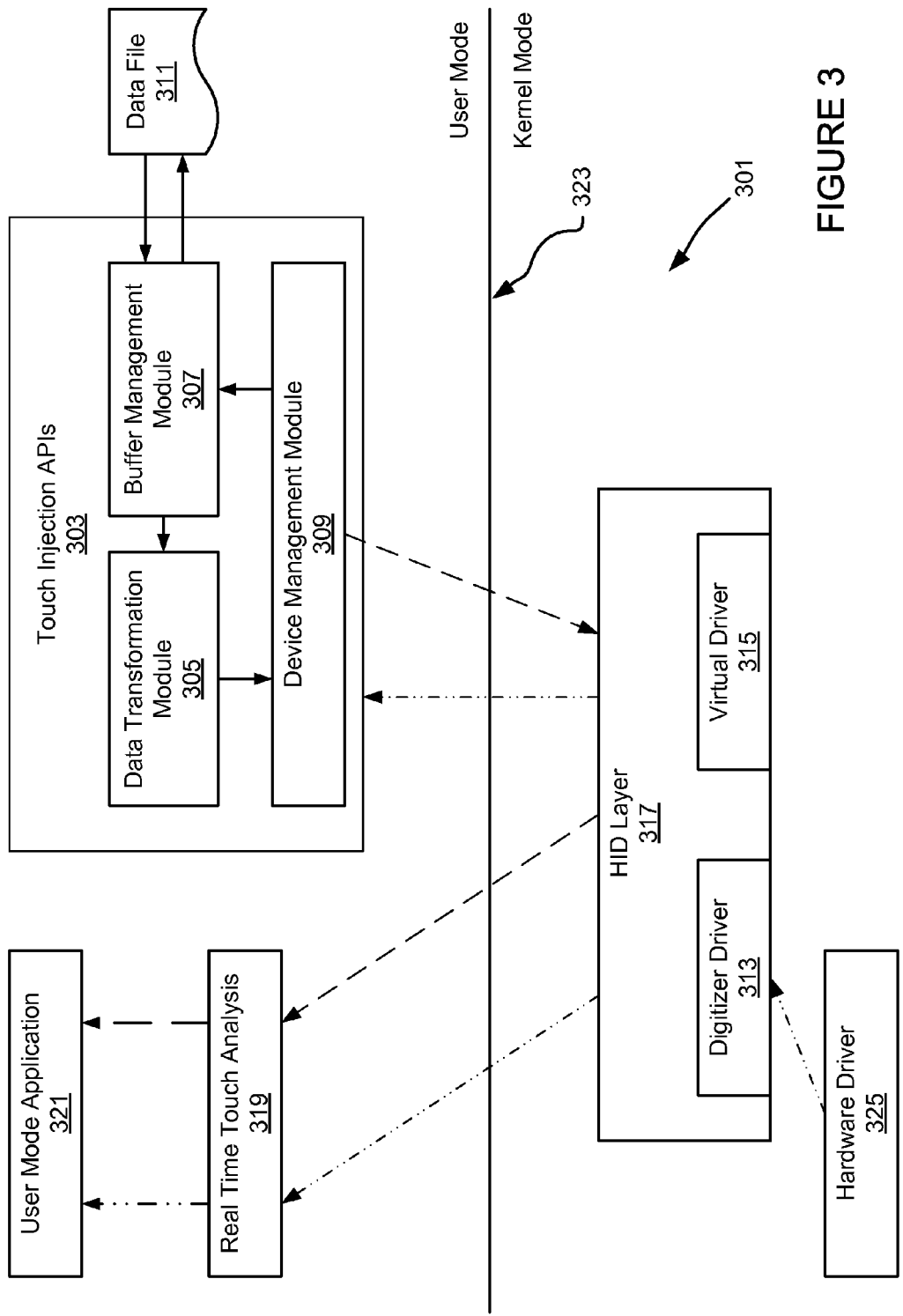
FIG. 3 illustrates a block diagram example of a computing system employing application programming interfaces for touch data capture and injection in accordance with at least one aspect of the present invention.

FIG. 3 illustrates a computing system 301 employing a touch input data capture and injection tool 303 that may be implemented in accordance with one or more aspects of the present invention. As shown, the tool 303 includes a data transformation module 305, a buffer management module 307, and a device management module 309. Together, these modules cooperate to create and employ a touch input data file 311. The tool 303 may be employed in a system 301 that also includes a digitizer driver 313, a hardware driver 325, a virtual driver 315, a human interface device (HID) layer 317, a real time touch analysis, such as the Windows Inking Service Platform (WISP), interface 319, and a user mode application 321. Line 323 separates the components of the system 301. The components that are typically executed in the operating kernel of a host computer are shown below line 323, while those components typically executed in user applications are shown above line 323.

When a user moves her finger 204 across the touch input surface 206 of the digitizer 165 (and, with some digitizers, above the surface of the digitizer 165), the hardware driver 325 forwards input data to the digitizer driver 313 that creates raw touch input data. This raw touch input data may include, for example, the position coordinate of the tip of a user's finger 204 relative to a coordinate axis for the digitizer 165. This raw touch input data may also include the pressure with which the finger 204 presses against the touch input area 206 of the digitizer 165 and the size of the finger 204 pressed against the touch input area 206. In a conventional implementation, the digitizer driver 313 provides this raw touch input data to the human interface device layer 317, which is responsible for managing data generated by various input devices. For example, the human interface device layer 317 may manage data generated by various pointing devices, including a mouse 161, touchpad, trackball, or joystick. The human interface device layer 317 may also manage data generated by other human interface device compliant input devices, such as a keyboard 162 or keypad.

The human interface device layer 317 then provides the touch input data to the real time touch analysis (WISP) interface 319, which converts the touch input data into electronic data. For example, the real time touch analysis interface 319 may create electronic hand strokes that correspond to sequentially detected coordinate positions of the user's finger 204 against the touch input area 206. The real time touch analysis interface 319 then provides the electronic data to the user mode application 321, which treats the electronic touch input data as input data. Together, the human interface device layer 317, the real time touch analysis interface 319, and the user mode application 321 (as well as any other intermediate software objects) form a "stack" of software objects. As will now be explained in more detail, the touch input data capture and injection tool 303 captures raw touch input data from the digitizer driver 313, and then subsequently injects the raw touch input data into the bottom of the stack through the human interface device layer 317 and the virtual driver 315. Injecting the raw touch input data into the bottom of the stack ensures that the whole software stack is exercised each time, as it would in normal end-user scenarios. Injecting at the lowest layer in the software stack also ensures that touch data is independent of all the processing and formatting that is done by the upper layers in the platform stack.

Figure 4:
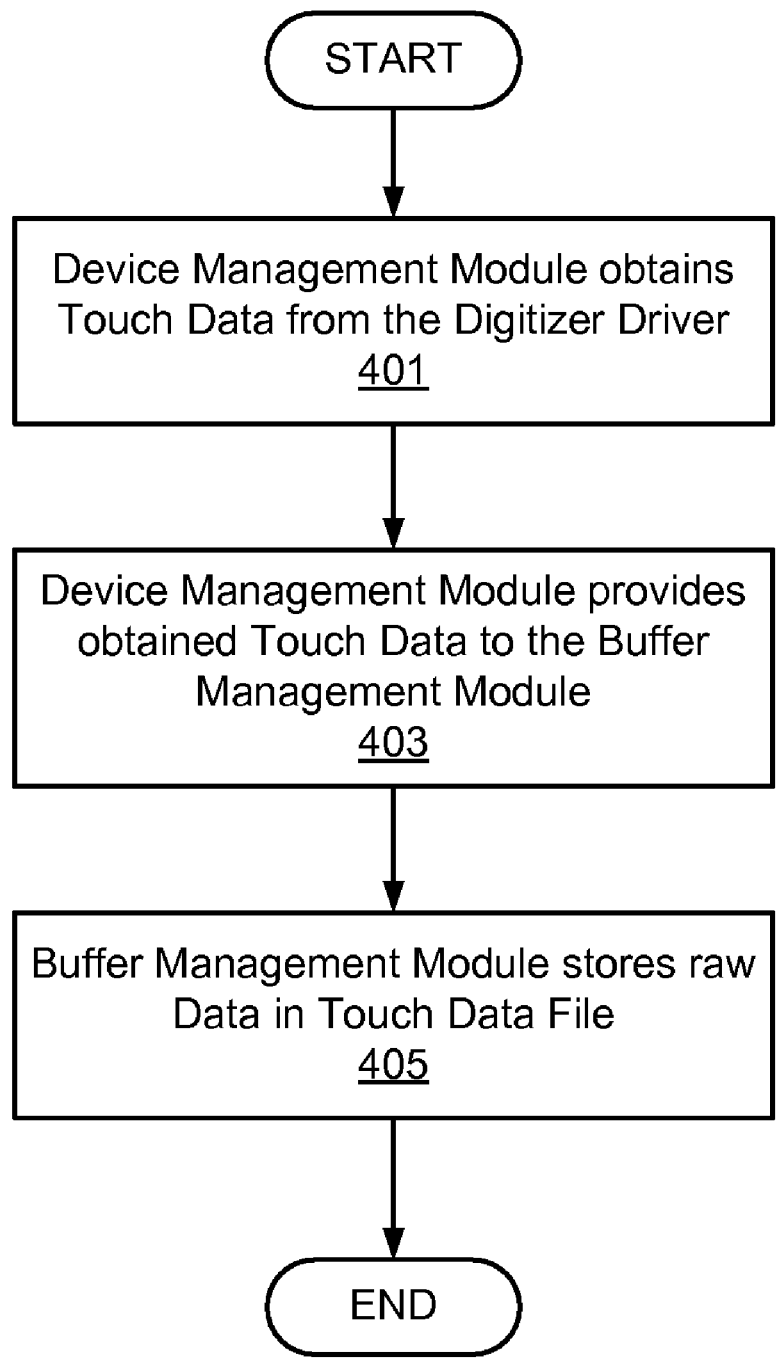
FIG. 4 is a flowchart of an illustrative process of capturing touch data in accordance with at least one aspect of the present invention.
Figure 5:
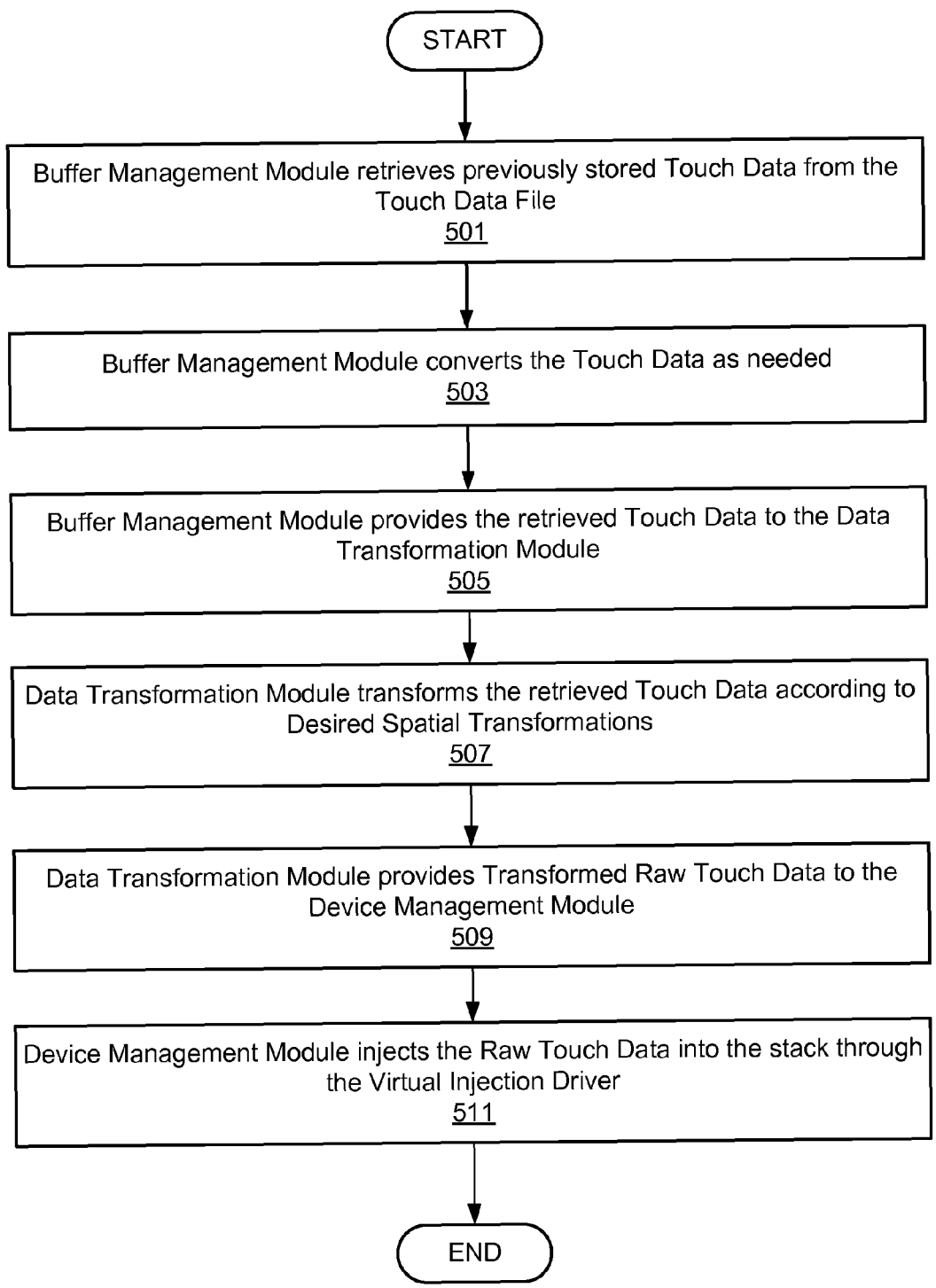
FIG. 5 is a flowchart of an illustrative process of injecting touch data in accordance with at least one aspect of the present invention.

The touch input data capture and injection tool 303 has two operational modes: a capture mode and an injection mode. These modes will now be discussed with reference to the flowcharts shown in FIGS. 4 and 5. In the data capture mode, the touch input data capture and injection tool 303 captures raw touch input data created by moving a user's finger 204 against (or, in some embodiments, over) the touch input area 206 surface of the digitizer 165. More particularly, in step 401, the device management module 309 obtains raw touch data from the digitizer driver 313 through the human interface device layer 317.

Next, in step 403, the device management module 309 provides the obtained raw touch data to the buffer management module 307. The buffer management module 307 then stores the raw touch data in the touch data file 311 in step 405.

The raw touch data may be stored using any of a number of different file formats. For example, the touch data may be stored in a file format specifically configured to store raw touch data. Alternately, the raw touch data may be embedded within a file having another type of file format, such as an extensible markup language (XML) file. In this manner, the touch data capture and injection tool 303 captures raw touch data for future use.

In the injection mode, the touch input data capture and injection tool 303 injects the previously captured touch data via the human interface device layer 317 into the bottom of the stack of software objects supporting the touch aware application, as previously noted. More particularly, referring to FIG. 5, in step 501, the buffer management module 307 retrieves previously stored touch data from the touch data file 311. It should be noted that various embodiments of the invention may allow the use of a variety of different touch data formats.

For example, the touch data file 311 may be created with a file format specifically configured to store raw touch data. Further, in addition to a file format specifically configured to store raw touch data, the touch data file 311 may be another type of file, such as an XML file, containing embedded raw touch data. Alternately or additionally, the touch data file 311 may inherently store touch data in the form of electronic ink file formats. If such an alternate file format is employed, then the buffer management module 307 will convert the touch data from this alternate data format to raw touch data in step 503.

The buffer management module 307 provides the retrieved touch data to the data transformation module 305 in step 505. The transformation module 305 then transforms the retrieved touch data, if necessary, according to desired spatial transformations in step 507. For example, the transformation module 305 may rotate the angle of the touch data (so that, e.g., the direction of electronic data generated from the touch data is angled). The transformation module 305 may also change the scale of the touch data (so that, e.g., the size of electronic data generated from the touch data changes), and the speed at which the touch data is injected into the software stack. The data transformation module 305 then provides the transformed raw touch data to the device management module 309 in step 509.

In step 511, the device management module 309 injects the raw touch data into the stack through the human interface device layer 317 and the virtual driver 315. As previously noted, the virtual driver 315 is managed by the operating kernel of the computer hosting the user mode application 321, which enables the touch data capture and injection tool 303 to pump raw touch data into the stack of software objects at its lowermost layer. The virtual driver 315 is similar to the digitizer driver 313, but the virtual driver 315 does not require a physical digitizer to function. Further, the virtual driver 315 can accept data from external sources other than the user's finger 204 (e.g., the device management module 309 of the tool 303).

Manually reproducing touch scenarios is difficult since two movements even by the same person in succession cannot be guaranteed to be exactly the same. Aspects of the present invention enable reproducing the exact sequence of events each time. It not only helps to run tests in a deterministic manner but also helps in reproducing defective code paths exactly, each time, which is beneficial for debugging purposes.

In accordance with other aspects of the present invention, touch data may be created and stored and/or injected out of any input stream that can be converted into touch data. As a result, a system may have touch data injected into it even without the actual touch hardware being present. For example, a stream of mouse data points with respect to a display screen may be converted by adding defaults for other touch properties. An illustrative touch property includes a confidence level, e.g., how likely the hardware interprets the contact to be a finger, such as a highly likely to be a finger or more likely to be something larger, such as a whole palm. As such, when utilizing one or more of these touch properties together, moving a mouse may effectively result in the system thinking that someone is moving a finger on a touch aware device.

Other illustrative touch properties include a width of a contact across a touch input surface and a height of a contact across a touch input surface. With respect to these properties, some type of measurement algorithm may be used to compare a contact width and/or height against a determined measurement for a finger input. Still another property includes a level of pressure/force applied to a touch input surface. With such a property, the amount of force applied with respect to another property, such as a width of a contact, may be used to test particular types of code paths that may correlate to an action in a user mode application. For example, application of a level of pressure at one point on a touch input surface during a particular time with respect to a user mode application may correlate to an action to initiate an event, such as launching a new window. Other properties may include a percentage of area of a touch input surface covered based upon an established threshold level, detection of different fingers to test a child's contact versus an adult's contact, and proximity, e.g., hovering over an area of a touch input surface.

Figure 6:
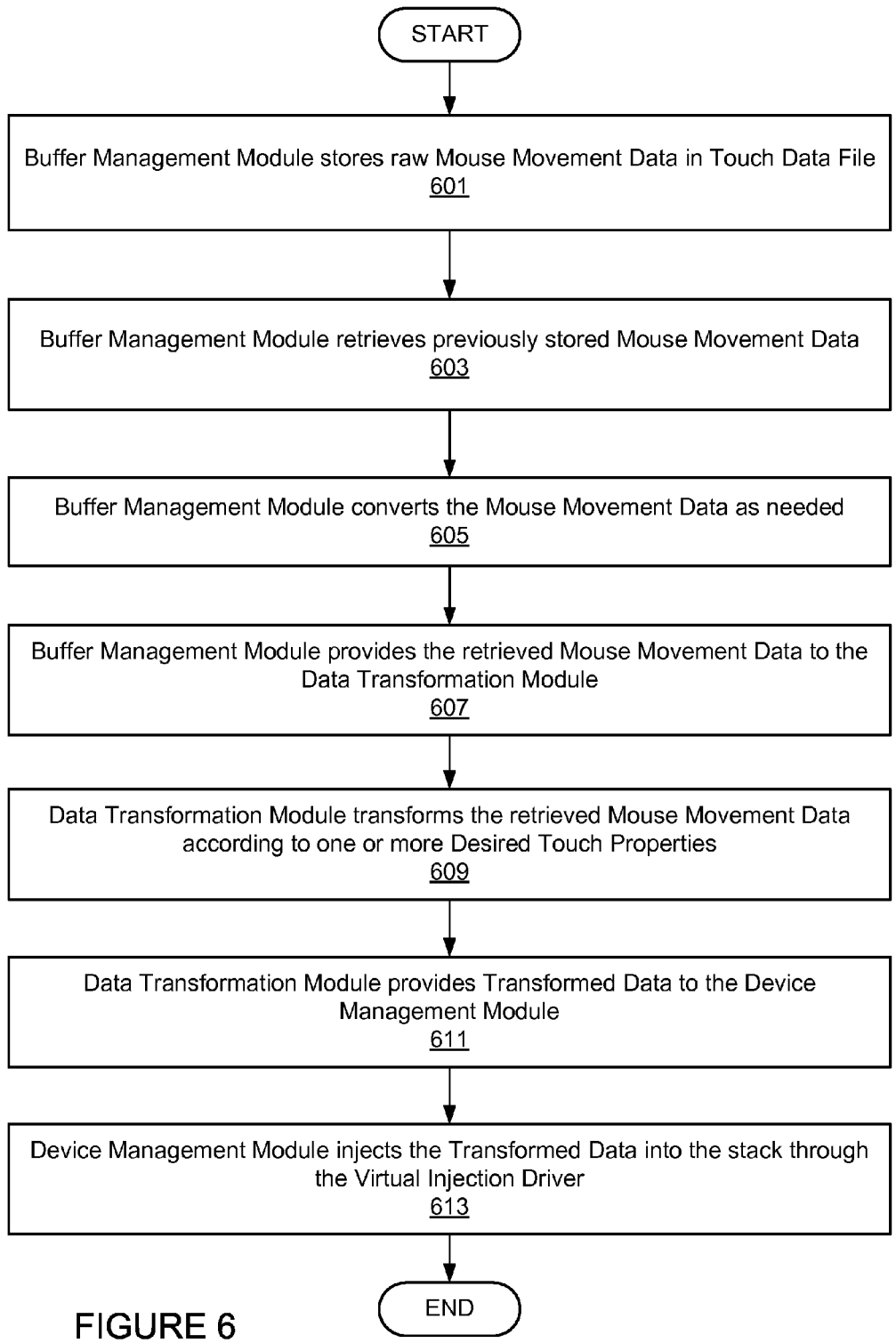
FIG. 6 is a flowchart of an illustrative process of injecting previously captured mouse data as touch data in accordance with at least one aspect of the present invention.

FIG. 6 is a flowchart of an illustrative process of injecting previously captured mouse data as touch data in accordance with one or more touch properties in accordance with at least one aspect of the present invention. In this example, during the capture mode, the buffer management module 307 stores raw mouse movement data in a touch data file 311. The raw mouse movement data may correspond to a stream of mouse data points on a display screen. It should be understood by those skilled in the art that the present example described a mouse movement data; however, any of a number of other input device data points may be utilized including, but not limited to, a keyboard, a trackball device, a joystick, a scroll wheel, and a stylus across a digitizer.

During injection mode of operation, in step 603, the buffer management module 307 retrieves the previously stored mouse movement data from the touch data file 311. It should be noted that various embodiments of the invention may allow the use of a variety of different data formats. If such an alternate file format is employed, then the buffer management module 307 will convert the mouse movement data from this alternate data format to raw mouse movement data in step 605.

The buffer management module 307 provides the retrieved mouse movement data to the data transformation module 305 in step 607. The transformation module 305 then transforms the retrieved movement data according to one or more desired touch properties in step 609. For example, the transformation module 305 may apply a variable corresponding to an amount of pressure/force applied to touch input area 206. The transformation module 305 may also apply a confidence level to the mouse movement data corresponding to a likeliness of the data corresponding to a finger of a user as opposed to something else, such as the palm of a user's hand. Other properties may be applied alone or in combination as needed for the injection of data. The data transformation module 305 then provides the transformed data to the device management module 309 in step 6011.

In step 613, the device management module 309 injects the transformed data into the stack through the human interface device layer 317 and the virtual driver 315. As previously noted, the virtual driver 315 is managed by the operating kernel of the computer hosting the user mode application 321, which enables the touch data capture and injection tool 303 to pump the transformed data into the stack of software objects at its lowermost layer. Still further, touch input data may be captured without a measurement of pressure, width, height, or other properties and stored in a touch data file 311. Then, the same previously stored data may be transformed by the data transformation module 305 to include a touch property to apply to the data. As such, layers of the software stack may be tested without need for measurements to actually be taken.

Various embodiments of the tool 303 may be implemented as part of a testing software application being used to test the user mode application 321. More particularly, various embodiments of the tool 303 may be implemented using application programming interfaces invoked by a testing software application configured to test one or more operations of the user mode application 321.

An application programming interface (or more simply, a programming interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 7B:
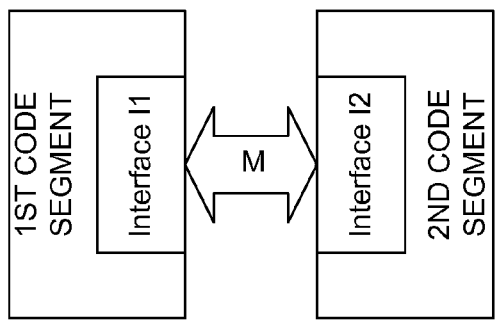
FIGS. 7A through 7L show a general-purpose computer environment supporting one or more aspects of the present invention.
Figure 7D:
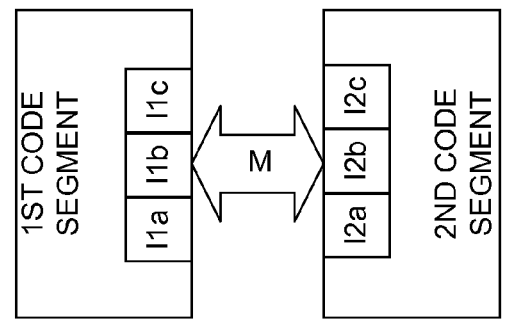
Figure 7A:
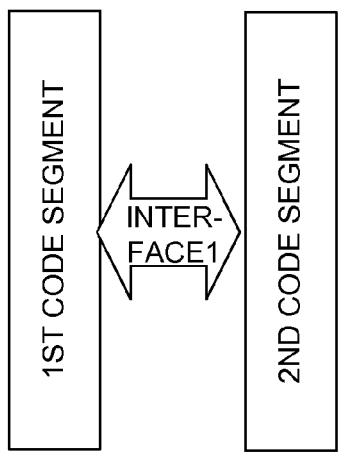

Notionally, a programming interface may be viewed generically, as shown in FIG. 7A or FIG. 7B. FIG. 7A illustrates an interface Interface1 as a conduit through which first and second code segments communicate. FIG. 7B illustrates an interface as comprising interface objects I1 and I2 (which may or may not be part of the first and second code segments), which enable first and second code segments of a system to communicate via medium M. In the view of FIG. 7B, one may consider interface objects I1 and I2 as separate interfaces of the same system and one may also consider that objects I1 and I2 plus medium M comprise the interface.

Although FIGS. 7A and 7B show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 7A and 7B, but they nonetheless perform a similar function to accomplish the same overall result. Some illustrative alternative implementations of a programming interface will now briefly be described.

A. Factoring

Figure 7C:
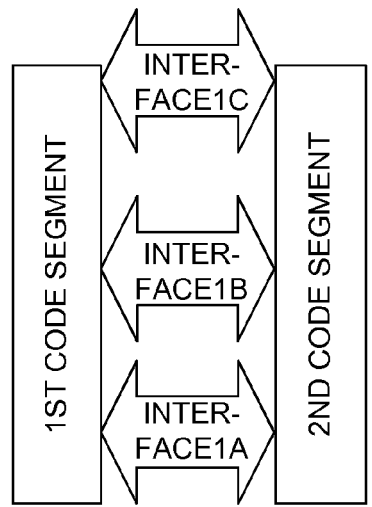

A communication from one code segment to another may be accomplished indirectly by breaking the communication into multiple discrete communications. This is depicted schematically in FIGS. 7C and 7D. As shown, some interfaces can be described in terms of divisible sets of functionality. Thus, the interface functionality of FIGS. 7C and 7D may be factored to achieve the same result, just as one may mathematically provide 24, or 2 times 2 times 3 times 2. Accordingly, as illustrated in FIG. 7C, the function provided by interface Interface1 may be subdivided to convert the communications of the interface into multiple interfaces Interface1A, Interface 1B, Interface 1C, etc. while achieving the same result. As illustrated in FIG. 7D, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc.

When factoring, the number of interfaces included with the $1^{st}$ code segment need not match the number of interfaces included with the $2^{nd}$ code segment. In either of the cases of FIGS. 7C and 7D, the functional spirit of interfaces Interface1 and I1 remain the same as with FIGS. 7A and 7B, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 7E:
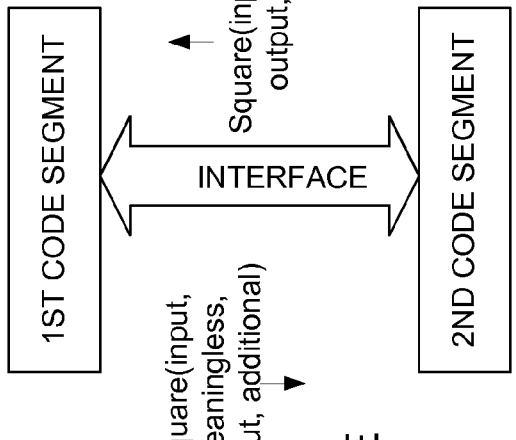
Figure 7F:
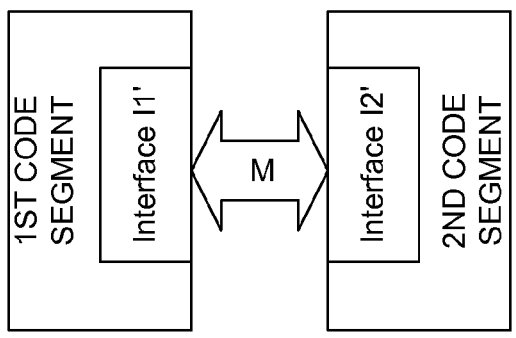

In some cases, it may be possible to ignore, add or redefine certain aspects (e.g., parameters) of a programming interface while still accomplishing the intended result. This is illustrated in FIGS. 7E and 7F. For example, assume interface Interface1 of FIG. 7A includes a function call Square(input, precision, output), a call that includes three parameters, input, precision and output, and which is issued from the 1st Code Segment to the 2nd Code Segment. If the middle parameter precision is of no concern in a given scenario, as shown in FIG. 7E, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 7F, interface I1 is replaced by interface I1', redefined to ignore or add parameters to the interface. Interface I2 may similarly be redefined as interface I2', redefined to ignore unnecessary parameters, or parameters that may be processed elsewhere. In other words, in some cases a programming interface may include aspects, such as parameters, which are not needed for some purpose, and so they may be ignored or redefined, or processed elsewhere for other purposes.

C. Inline Coding

Figure 7G:
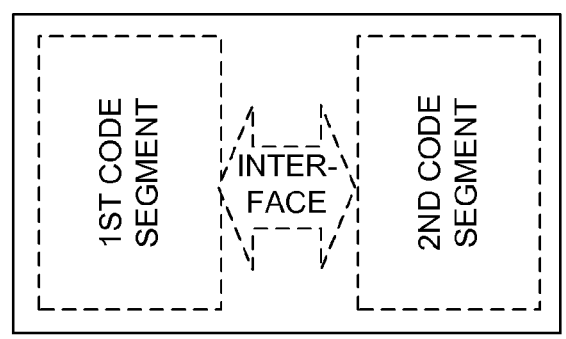
Figure 7H:
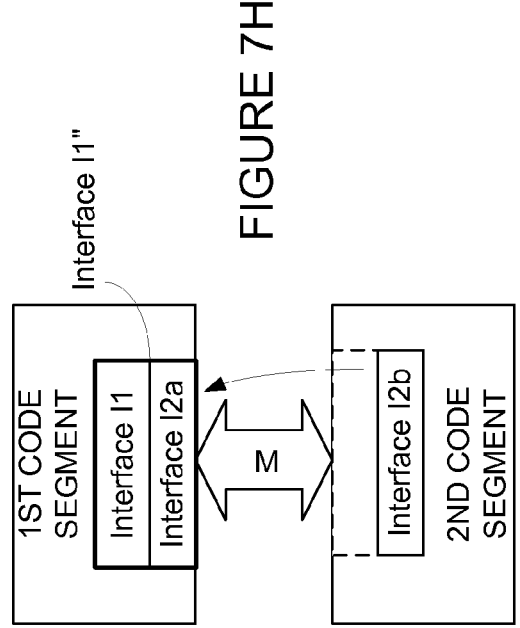

It may also be feasible to merge some or all of the functionality of two separate code modules such that the "interface" between them changes form. For example, the functionality of FIGS. 7A and 7B may be converted to the functionality of FIGS. 7G and 7H, respectively. In FIG. 7G, the previous $1^{st}$ and $2^{nd}$ Code Segments of FIG. 7A are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, as shown in FIG. 7H, part (or all) of interface I2 from FIG. 7B may be written inline into interface I1 to form interface I1". As illustrated, interface I2 is divided into I2$a$ and I2$b$, and interface portion I2$a$ has been coded in-line with interface I1 to form interface I1". For a concrete example, consider that the interface I1 from FIG. 7B performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

A communication from one code segment to another may be accomplished indirectly by breaking the communication into multiple discrete communications. This is depicted schematically in FIGS. 7I and 7J. As shown in FIG. 7I, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible.

Figure 7J:
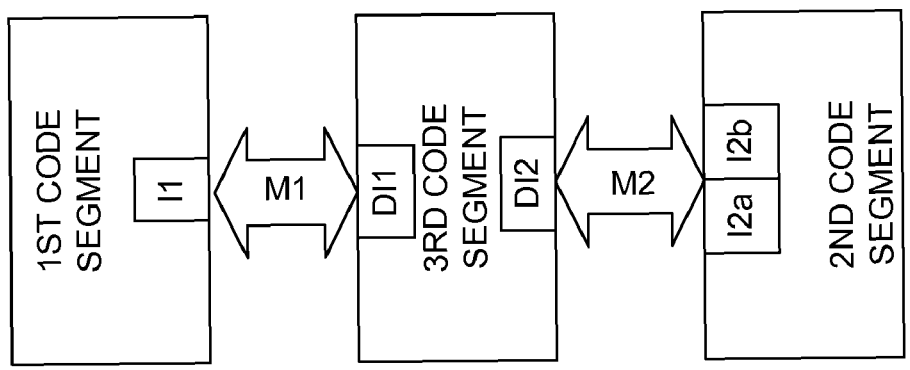
Figure 7I:
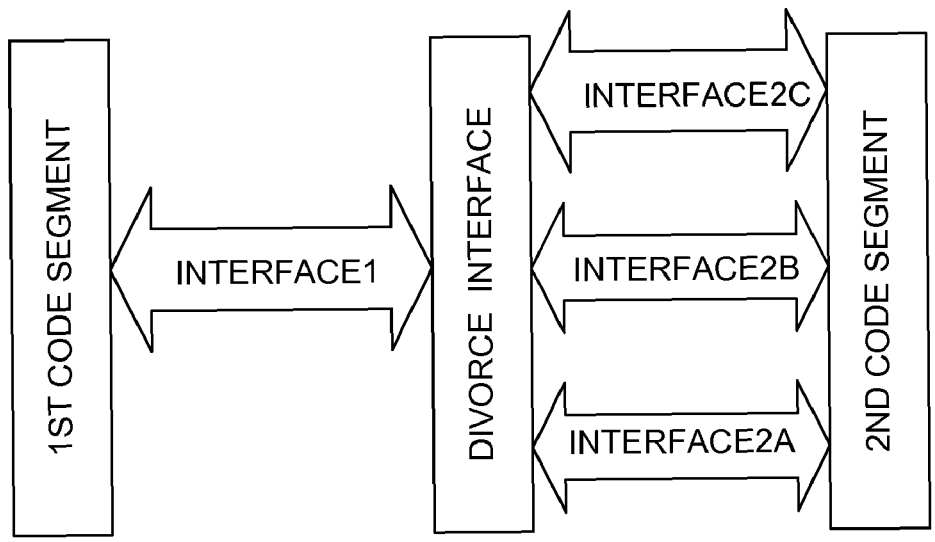

Similarly, as shown in FIG. 7J, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 7B to a new operating system, while providing the same or similar functional result.

E. Rewriting

Figure 7K:
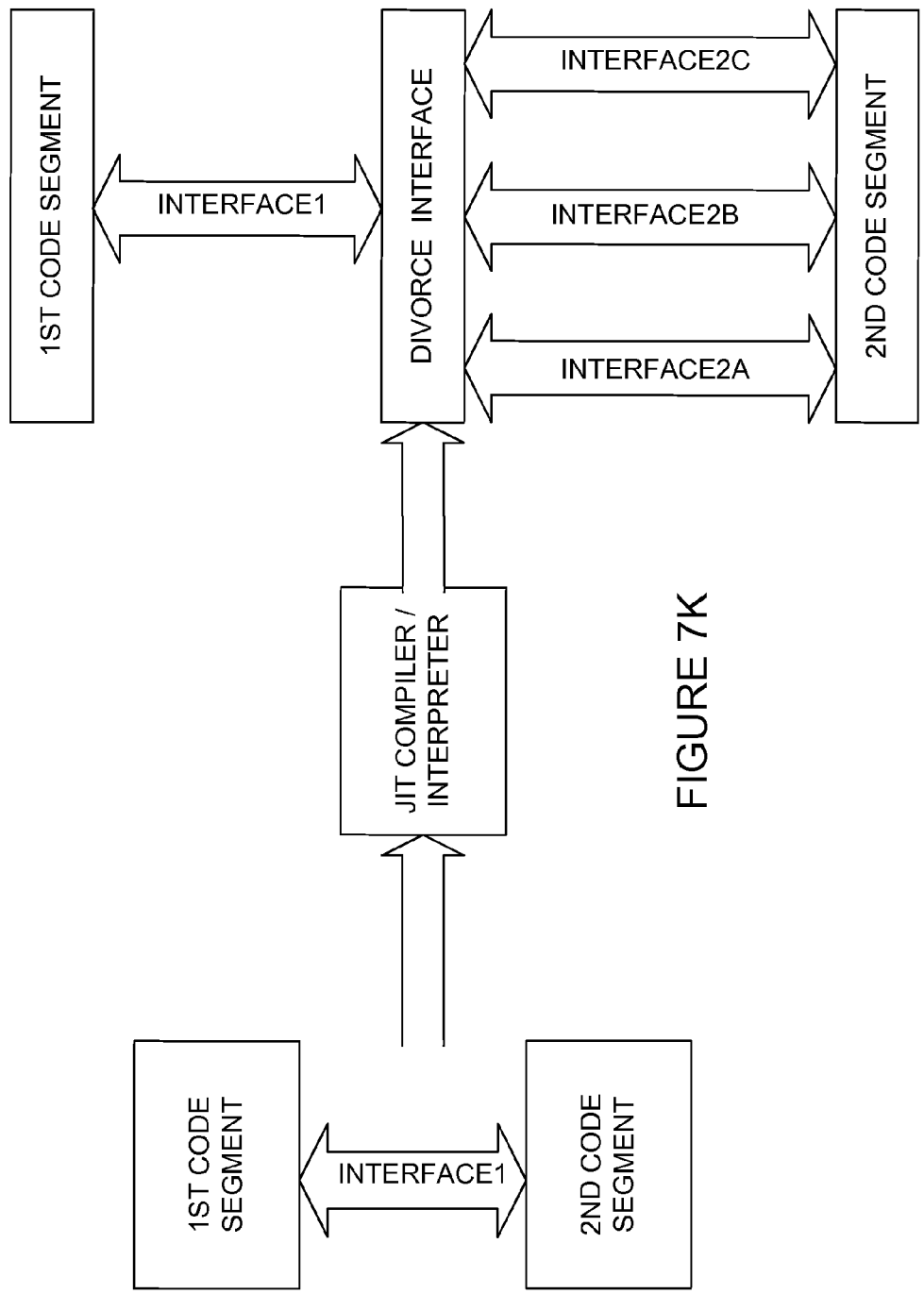
Figure 7L:
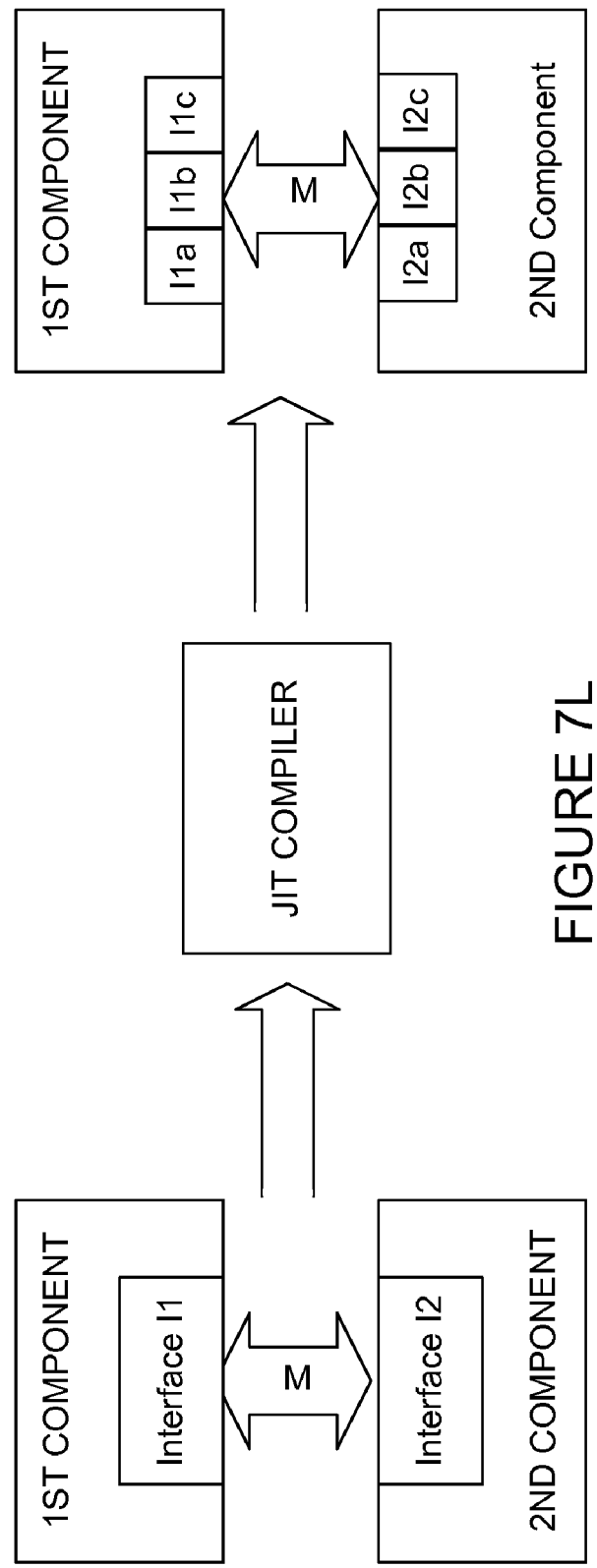

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 7K and 7L. As can be seen in FIG. 7K, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 7L, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 7A and 7B. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Returning now to the particular discussion of the tool 303, various embodiments of the invention may provide a CaptureTouchEvent( ) application programming interface (API), which enables the data capture and storage of raw touch data in any desired file format. As previously noted, with various embodiments of the invention, captured raw touch data may be stored using a file format specifically configured to store touch data, or it may be embedded in a file using another type of file format (such as an XML file). This application programming interface (API) thus may employ a filename argument (e.g., "Touch_Data_Test_Data_007"), which defines the file name for the touch data file 311 to which touch data will be captured.

This API also may employ a mode parameter, defining how the API will operate. With various embodiments of the invention, for example, the CaptureTouchEvent( ) API may operate in a first Capture Stop mode, which defines how the touch data capture process will end, and a second Data Storage mode, which defines how the touch data will be stored in the pen data file 311. During execution, the CaptureTouchEvent( ) API may then return a "success" message after it has successfully captured the designated touch data, an "invalid arguments" message if the arguments passed to the CaptureTouchEvent( ) API are not correct, and a "fail" message for any other type of failure. The CaptureTouchEvent( ) API may also create a notification event (e.g., "CaptureTouchEvent") to other software objects upon completing the pen data capture. An illustrative calling convention for the CaptureTouchEvent( ) API is CaptueTouchEvent(File_Name, Mode_Parameter). The File_Name argument defines the touch data file to capture into. The Mode_Parameter argument defines the mode to capture the touch data into, e.g., first Capture Stop mode, second Data Storage mode, certain amount of time, user input initiated, etc.

Various embodiments of the invention also may provide an InjectTouchEventFromFile( ) API, which injects touch data from a designated file into the software stack. The InjectTouchEventFromFile( ) API may employ a parameter designating the file from which the touch data will be retrieved (e.g., "Touch_Data_Test_Data_007"), and one or more parameters defining how the retrieved touch data will be transformed before being injected into the software stack.

For example, the InjectTouchEventFromFile( ) API may employ parameters defined in a metadata structure for manipulating the retrieved touch data. The metadata may include a parameter dwMode, which defines the stop mode for replaying (or injecting) retrieved touch data. Valid values for this parameter may thus include, for example, PI_INJECT_STOP_TOUCHONLY_MODE, which will cause the touch data replay to stop when all of the retrieved touch data has been replayed or an End( ) method is called to stop the injection process. This parameter may also have the value PI_INJECT_STOP_EVENT_MODE, which will cause the replay of the touch data to stop when a previously created event has been signaled. This event, named, for example, TouchEndEvent, should have been already created by the caller of this method, otherwise the method will fail.

Still further, the metadata may include the parameter dwTransform, which defines the type of transformation to be performed on the retrieved touch data. This parameter may include such valid values as PI_TRANSFORM_NONE, which causes no transformations to be performed on the retrieved touch data, PI_TRANSFORM_SCALE, which causes the retrieved touch data to be scaled along one or both axes. If this value is selected, then the metadata will additionally include one or more parameters describing the type of desired scaling, such as a parameter psScaleFactor.

If the scaled retrieved touch data is to be injected at a specifically defined rectangle within a user interface space provided by the user mode application 321, then the metadata will also include one or more parameters defining this rectangle. For example, the metadata may include a parameter prcLocation, defining the left top and right bottom of the new rectangle. Similarly, if the touch data is to be injected into a bounding box in the user interface space of the user mode application 321, then the parameter dwTransform may have the value PI_TRANSFORM_BOUNDINGBOX. Again, the metadata may include a parameter prcLocation, defining the bounding box.

If the touch data is to be rotated before it is injected into the user interface space of the user mode application 321, then the dwTransform parameter may have the value PI_TRANSFORM_ROTATE_ORIGIN. This value causes the touch data to be rotated anticlockwise with the left top of its bounding box as the center. The value of a parameter flRotationAngle may then define the angle of rotation.

If the touch data is to be injected into the user interface space of the user mode application 321 at a desired speed, then the dwTransform parameter may have the value PI_TRANSFORM_TIME. This value causes the retrieved touch data to be replayed faster or slower than the actual speed of its recording. The value of the parameter flTimescale then defines the factor by which the speed is to be multiplied. A value of 1 may be the same speed at which the touch data was captured. If, for example, the value of this parameter is >1, then the touch data may be injected at a faster speed than the capture speed. Correspondingly, a value between 0 and 1 may cause the touch data to be injected at a speed slower than the capture speed.

During execution, the InjectTouchEventFromFile ( ) API may then return a "success" message after it has successfully injected the retrieved touch data, and an "invalid arguments" message if the arguments passed to the InjectTouchEventFromFile ( ) API are not correct. The InjectTouchEventFromFile( ) API may also generate an "out of memory" message if some allocation of memory fails, an "access denied" message if some resource being requested by the API is not present, and a "fail" message for any other type of failure. The InjectTouchEventFromFile( ) API may also create a notification event (e.g., "InjectTouchEventFromFile") to other software objects upon completing the injection of the retrieved touch data. An illustrative calling convention for the InjectTouchEventFromFile( ) API is InjectTouchEventFromFile (File_Name, Struture_of_Properties). The File_Name argument defines the touch data file to be injected into the system. The Structure_of_Properties argument defines the set of transforms to be applied to the touch data, e.g., scaling x and/or y, bound to defined space, rotate data on the screen, capture horizontally but apply vertically, change inject speed with respect to capture speed, etc.

Still further, various embodiments of the invention also may provide an InjectTouchEventFromBuffer( ) API to enable injection of data from a user defined buffer. The InjectTouchEventFromBuffer( ) API may employ, for example, a data buffer parameter (e.g., "Buffer_007") defining the data buffer from which it will retrieve touch data. The InjectTouchEventFromBuffer( ) API may also employ a data packet count parameter (e.g., "dwCount") defining the number of data packets that will be retrieved from the buffer, and one or more parameters defining how the retrieved touch data will be transformed before being injected into the software stack.

Like the InjectTouchEventFromFile ( ) API, the InjectTouchEventFromBuffer( ) API may return a "success" message after it has successfully injected the retrieved touch data, and an "invalid arguments" message if the arguments passed to the are not correct. The InjectTouchEventFromBuffer ( ) API may also generate an "out of memory" message if some allocation of memory fails, an "access denied" message if some resource being requested by the API is not present, and a "fail" message for any other type of failure. The InjectTouchEventFromBuffer( ) API may also create a notification event (e.g., "InjectTouchEventFromBuffer") to other software objects upon completing the injection of the retrieved touch data. An illustrative calling convention for the InjectTouchEventFromBuffer( ) API is InjectTouchEventFromBuffer (Pointer_to_Buffer, Buffer_Size, Struture_of_Properties). The Pointer_to_Buffer argument points to the buffer that includes the touch data file to be injected into the system. The Buffer_Size argument defines the size of the buffer being pointed to. The Structure_of_Properties argument may be the same as for the InjectTouchEventFrom File( ) API, which defines the set of transforms to be applied to the touch data, e.g., scaling x and/or y, bound to defined space, rotate data on the screen, capture horizontally but apply vertically, change inject speed with respect to capture speed, etc.

As noted above, various embodiments of the tool 303 may be implemented within a separate testing application employed by a user, such as a software developer using the tool 303 to test a new software application. With some embodiments the testing application may include functionality to test a variety of operations of the user mode application 321, in addition to the processing of touch data.

With still other embodiments of the invention, however, the tool 303 may be implemented in a testing utility designed solely to test how the user mode application processes touch data. With these embodiments, the user may employ the utility to capture data in a desired file format, transform and inject touch data into the software stack, or both, before using the data in the automation code.

For example, a capture function of the utility may employ a parameter naming the file in which captured data will be stored (e.g., "filename"), while a replay function of the utility may employ a parameter naming the file from which touch data will be retrieved (e.g., "filename"). The replay function of the utility may also employ various parameters specifying how the retrieved touch data will be transformed before it is injected into the software stack. Thus, the replay function may employ parameters defining how the touch data will be scaled in an x-axis direction (e.g., "sx"), scaled in a y-axis direction (e.g., "sy") or both (e.g., "sxy") relative to, for example, a reference point (e.g., a left topmost reference point).

The replay function may also use a parameter defining a bounding box for the retrieved pen data (e.g., "b") by, for example, a left top and right bottom of the bounding box. The replay function may also use a parameter defining a rotational angle for the retrieved pen data (e.g., "r"), and a parameter defining a time multiplication factor for a speed at which the retrieved pen data will be injected into the software stack (e.g., "t"). Thus, a user may input a command Utility replay -f Datafile.*** -sxy 2 2 100 100-r 165 into the utility. This command instructs the utility to retrieve touch data from the file Datafile.*** and then inject the retrieved touch data such that it is scaled by a factor of 2 in both the x and y directions, with the left top of its bounding box positioned at screen co-ordinates (100,100) and the entirety of the touch data is rotated by 165° around that point in the anticlockwise direction.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-readable storage medium configured to store computer-readable instructions for injecting touch data, that when executed by a computer, cause the computer to perform:
retrieving data from a touch data file, the retrieved data being captured without measurement of a plurality of touch properties, the retrieved data representing a movement of at least one of a mouse, keyboard, trackball, joystick, keypad or stylus on a display screen;
transforming the retrieved data by utilizing one or more of the plurality of touch properties to convert the movement represented by the retrieved data to simulate a corresponding touch and movement of a finger on a touch aware device; and
injecting the transformed retrieved data into a lowermost layer of a stack of software objects.

2. The computer-readable storage medium of claim 1, wherein the retrieved data is converted into touch data by the transforming.

3. The computer-readable storage medium of claim 2, wherein injecting the transformed retrieved data includes injecting the transformed retrieved data through a virtual driver.

4. The computer-readable storage medium of claim 2, wherein retrieving data includes:
retrieving data stored in the touch data file as electronic ink data; and
converting the electronic ink data to the touch data.

5. The computer-readable storage medium of claim 2, wherein the stack of software objects includes a human interface device layer, a real time touch analysis layer, and user mode application.

6. The computer-readable storage medium of claim 1, wherein at least one of the plurality of touch properties is a confidence value indicating whether at least a portion of the retrieved data or the transformed retrieved data corresponds to the movement by the finger.

7. The computer-readable storage medium of claim 1, wherein at least one of the plurality of touch properties is a pressure value corresponding to an amount of force applied to a touch input area of a touch aware device.

8. The computer-readable storage medium of claim 1, wherein transforming the retrieved data includes transforming the retrieved data based upon a second of the plurality of touch properties.

9. The computer-readable storage medium of claim 1, wherein the retrieved data is a stream of data points.

10. The computer-readable storage medium of claim 1, wherein the computer-readable instructions further cause the computer to perform:
capturing the retrieved data from a digitizer driver; and
storing the captured retrieved data in the touch data file.

11. The computer-readable storage medium of claim 1, wherein transforming the retrieved data includes rotating the retrieved data, scaling the retrieved data, or both.

12. The computer-readable storage medium of claim 1, wherein transforming the retrieved data includes determining a speed for injecting the transformed retrieved data.

13. One or more computer-readable storage media storing computer-readable instructions for communicating with a human interface device, the computer-readable instructions for injecting touch data into the human interface device, the one or more computer-readable media comprising:
a device management module configured to inject transformed retrieved data into a human interface device;
a buffer management module configured to retrieve data from a touch data file, the retrieved data representing a movement of at least one of a mouse, keyboard, trackball, joystick, keypad or stylus on a display screen; and
a data transformation module configured to transform the retrieved data by utilizing one or more of a plurality of touch properties to convert the movement represented by the retrieved data to simulate a corresponding movement and touch of a finger on a touch aware device.

14. The one or more computer-readable storage media of claim 13, wherein the retrieved data is transformed into raw touch data that is injected into the human interface device through a virtual driver.

15. The one or more computer-readable storage media of claim 13, wherein the device management module is further configured to capture the retrieved data from a digitizer driver of the human interface device and the buffer management module is further configured to store the captured retrieved data in the touch data file.

16. The one or more computer-readable storage media of claim 13, wherein the data transformation module is further configured to transform the retrieved data based upon an additional of the plurality of touch properties.

17. The one or more computer-readable storage media of claim 13, wherein the retrieved data is a stream of data points from a computer input device.

18. The one or more computer-readable storage media of claim 13, wherein the data transformation module is further configured to determine a speed for injecting the transformed retrieved data.

19. A software architecture stored on one or more computer-readable storage media of a computing device, the one or more computer-readable storage media for processing data representative of a request to inject transformed retrieved data into a lowermost layer of a stack of a software object, comprising:
a digitizer driver to capture mouse movement data corresponding to a stream of mouse data points associated with a movement of a mouse on a display screen;
a buffer management module to store the mouse movement data in a touch data file and to retrieve at least a portion of the mouse movement data from the touch data file;
a first component configured to transform the at least a portion of the mouse movement data retrieved from the touch data file into touch data by utilizing one or more touch properties to convert the at least a portion of the mouse movement data into a corresponding touch and movement of a finger of a user of a touch aware device, at least one of the one or more touch properties including a confidence level indicating whether the at least a portion of the mouse movement data corresponds to the movement by the finger;
a second component configured to inject the at least a portion of the mouse movement data transformed by the first component into a lowermost layer of a stack of a software object; and
at least one application program interface to access the first and second components.

20. The software architecture of claim 19, wherein the computing device interprets the movement of the mouse as the movement of the finger on the touch aware device without the touch aware device being present on the computing device.

* * * * *